(12) United States Patent
Miyamae et al.

(10) Patent No.: US 6,788,467 B2
(45) Date of Patent: Sep. 7, 2004

(54) ELECTRO-OPTICAL DEVICE HAVING REDUCED SIZE AND IMPROVED LIGHT UTILIZATION EFFICIENCY AND ELECTRONIC USING THE SAME

(75) Inventors: Akira Miyamae, Suwa (JP); Kimio Nagasaka, Suwa (JP)

(73) Assignee: Seiko Epson Corporation, Tokyo (JP)

(*) Notice: Subject to any disclaimer, the term of this patent is extended or adjusted under 35 U.S.C. 154(b) by 125 days.

(21) Appl. No.: 10/011,294

(22) Filed: Dec. 11, 2001

(65) Prior Publication Data

US 2002/0093743 A1 Jul. 18, 2002

(30) Foreign Application Priority Data

Dec. 15, 2000 (JP) ........................................ 2000-382572

(51) Int. Cl.[7] ........................ G02B 27/14; G02F 1/1335
(52) U.S. Cl. ........................ 359/619; 359/623; 349/95
(58) Field of Search ............................. 359/619, 620, 359/622, 623, 624, 625, 626; 353/82, 84; 349/108, 113, 95, 110, 111

(56) References Cited

U.S. PATENT DOCUMENTS

| | | | | | |
|---|---|---|---|---|---|
| 5,550,656 A | * | 8/1996 | Sprague et al. | ................. | 349/5 |
| 5,623,348 A | * | 4/1997 | Ogino | .......................... | 349/95 |
| 6,038,005 A | * | 3/2000 | Handschy et al. | .......... | 359/619 |
| 6,466,375 B1 | * | 10/2002 | Kanaya | ....................... | 359/619 |
| 6,487,017 B1 | * | 11/2002 | Gunn et al. | .................... | 349/95 |
| 2002/0093742 A1 | * | 7/2002 | Miyamae et al. | ............ | 359/619 |

FOREIGN PATENT DOCUMENTS

| JP | A-8-190095 | 7/1996 |
|---|---|---|
| JP | A-9-167513 | 6/1997 |

* cited by examiner

Primary Examiner—Georgia Epps
Assistant Examiner—Alicia M. Harrington
(74) Attorney, Agent, or Firm—Oliff & Berridge, PLC (57) ABSTRACT

The present invention provides an electro-optical device can include a dot-like light source array in which a plurality of light-emitting elements for emitting red light, a plurality of light-emitting elements for emitting green light, and a plurality of light-emitting elements for emitting blue light are arranged. The device can further include a microlens array in which a plurality of micolenses are arranged and an optical modulation panel having a plurality of pixels for red light, a plurality of pixels for green light, a plurality of pixels for blue light, and a plurality of transmissive windows corresponding to the pixels. The electro-optical device can be configured so that by the microlens array light from the light-emitting elements for emitting red light is collected at the transmissive windows corresponding to the pixels for red light, light from the light-emitting elements for emitting green light is collected at the transmissive windows corresponding to the pixels for green light, and light from the light-emitting elements for emitting blue light is collected at the transmissive windows corresponding to the pixels for blue light.

17 Claims, 6 Drawing Sheets

ELECTRO-OPTICAL DEVICE HAVING REDUCED SIZE AND IMPROVED LIGHT UTILIZATION EFFICIENCY AND ELECTRONIC USING THE SAME

BACKGROUND OF THE INVENTION

1. Field of Invention

The present invention relates to an electro-optical device and an electronic device using the electro-optical device.

2. Description of Related Art

Currently, electro-optical devices, such as projectors, can include a light source for emitting white light, a plurality of dichroic mirrors, R, G, and B liquid crystal light valves, a dichroic prism, and a projection lens. White light emitted from the light source can be separated into light beams of three colors, R (red), G (green), and B (blue) by a plurality of dichroic mirrors, and can further be modulated pixel by pixel by the R, G, and B liquid crystal light valves, thereby forming R, G, and B images. The R, G, and B images formed by the liquid crystal light valves are synthesized by the dichroic prism so as to form a color image. The image is projected (enlarged and projected) onto a screen (not shown) by the projection lens.

However, the above projector is large and the typical cost of the projector is high. In order to reduce the size and cost of the device, an integrated dichroic mirror type, a color grating (hologram color filter) type, a time sharing type (color sequential driving type), and the like have been proposed. All the above methods however have mixed advantages and disadvantages in terms of size reduction, quality, cost, light utilization efficiency, and the like. In particular, since the source light is projected (applied) from the side, size reduction is difficult, and the utilization efficiency of the light emitted from the light source is low.

SUMMARY OF THE INVENTION

An object of the present invention is to provide an electro-optical device which has the advantage in size reduction and which achieves a high utilization efficiency of light emitted from a light source. The present invention can provide an electro-optical device that includes a dot-like light source array in which a plurality of light-emitting elements for emitting red light, a plurality of light-emitting elements for emitting green light, and a plurality of light-emitting elements for emitting blue light are arranged. The present invention can also include a microlens array in which a plurality of microlenses are arranged, and an optical modulation panel having a plurality of pixels for red light, a plurality of pixels for green light, a plurality of pixels for blue light, and a plurality of transmissive windows corresponding to the pixels. The electro-optical device can be configured so that the microlens array collects light from the light-emitting elements for emitting red light at the transmissive windows corresponding to the pixels for red light, light from the light-emitting elements for emitting green light at the transmissive windows corresponding to the pixels for green light, and light from the light-emitting elements for emitting blue light at the transmissive windows corresponding to the pixels for blue light.

The present invention provides an electro-optical device that includes a dot-like light source array in which a plurality of light-emitting elements for emitting red light, a plurality of light-emitting elements for emitting green light, and a plurality of light-emitting elements for emitting blue light are arranged, a microlens array in which a plurality of microlenses are arranged, and an optical modulation panel having a plurality of pixels for red light, a plurality of pixels for green light, a plurality of pixels for blue light, and a plurality of transmissive windows corresponding to the pixels. The light-emitting elements, the microlenses of the microlens array, and the pixels and the transmissive windows of the optical modulation panel being arranged so that the microlens array collects light from the light-emitting elements for emitting red light at the transmissive windows corresponding to the pixels for red light, light from the light-emitting elements for emitting green light at the transmissive windows corresponding to the pixels for green light, and light from the light-emitting elements for emitting blue light at the transmissive windows corresponding to the pixels for blue light.

The present invention provides an electro-optical device that includes a dot-like light source array in which a plurality of light-emitting elements for emitting red light, a plurality of light-emitting elements for emitting green light, and a plurality of light-emitting elements for emitting blue light are arranged, a microlens array in which a plurality of microlenses are arranged, and an optical modulation panel having a plurality of pixels for red light, a plurality of pixels for green light, a plurality of pixels for blue light, and a plurality of transmissive windows corresponding to the pixels. The light-emitting elements, the microlenses of the microlens array, and the pixels and the transmissive windows of the optical modulation panel being arranged so that the microlenses of the microlens array collect light from the light-emitting elements for emitting red light at a plurality of transmissive windows corresponding to the pixels for red light, collect light from the light-emitting elements for emitting green light at a plurality of transmissive windows corresponding to the pixels for green light, and collect light from the light-emitting elements for emitting blue light at a plurality of transmissive windows corresponding to the pixels for blue light.

The present invention provides an electro-optical device according to the invention, wherein the light-emitting elements, the microlenses of the microlens array, and the pixels and the transmissive windows of the optical modulation panel are placed so that the microlenses of the microlens array collect light beams emitted from the light-emitting elements at the transmissive windows.

The present invention provides an electro-optical device according to any of (1) to (3) above, wherein the dot-like light source array includes a plurality of dot-like light source units, each of the dot-like light source units having at least one light-emitting element for emitting red light, at least one light-emitting element for emitting green light, and at least one light-emitting element for emitting blue light, and wherein the optical modulation panel includes an optical modulation unit array in which a plurality of optical modulation units are arranged, each of the optical modulation units having at least one pixel for red light and a corresponding transmissive window, at least one pixel for green light and a corresponding transmissive window, and at least one pixel for blue light and a corresponding transmissive window.

The present invention provides an electro-optical device described above, which is configured so that conditions given by the following equations are satisfied:

$$PL = \{Ps \cdot Pa/(Ps+Pa)\} \cdot n \text{ (}n\text{ is a natural number)}$$

$$La/Ls = Pa/Ps$$

where Ps represents the pitch of the dot-like light source units, Pa represents the pitch of the optical modulation units, PL represents the pitch of the microlenses of the microlens array, Ls represents the optical distance between the light-emitting elements and the microlens array, and La represents the optical distance between the microlens array and the transmissive windows of the optical modulation panel.

The present invention can provide an electro-optical device described above, wherein the pitch Ps of the dot-like light source units is greater than the pitch Pa of the optical modulation units.

The present invention can provide an electro-optical device described above, wherein the light-emitting elements are light-emitting diodes.

The present invention can provide an electro-optical device described above, wherein the light-emitting elements emit laser light.

The present invention can provide an electro-optical device described above, wherein the light-emitting elements are organic EL elements or inorganic EL elements.

The present invention can provide an electro-optical device described above, wherein the microlens array is a Fresnel microlens array.

The present invention can provide an electro-optical device described above, wherein the microlens array is molded by injection molding or polymerization.

The present invention can provide an electro-optical device described above, wherein the electro-optical device is a direct-view display device, and has a light-scattering layer disposed on the emergent side of the optical modulation panel.

The present invention can provide an electro-optical device described above, wherein the electro-optical device is a direct-view display device or a projection display device.

BRIEF DESCRIPTION OF THE DRAWINGS

The invention will be described with reference to the accompanying drawings, in which like numbers represent like elements, and in which.

DETAILED DESCRIPTION OF PREFERRED EMBODIMENTS

Electro-optical devices according to preferred embodiments of the present invention, including embodiments discussed above, will be described in detail below with reference to the attached drawings.

Figure 1:
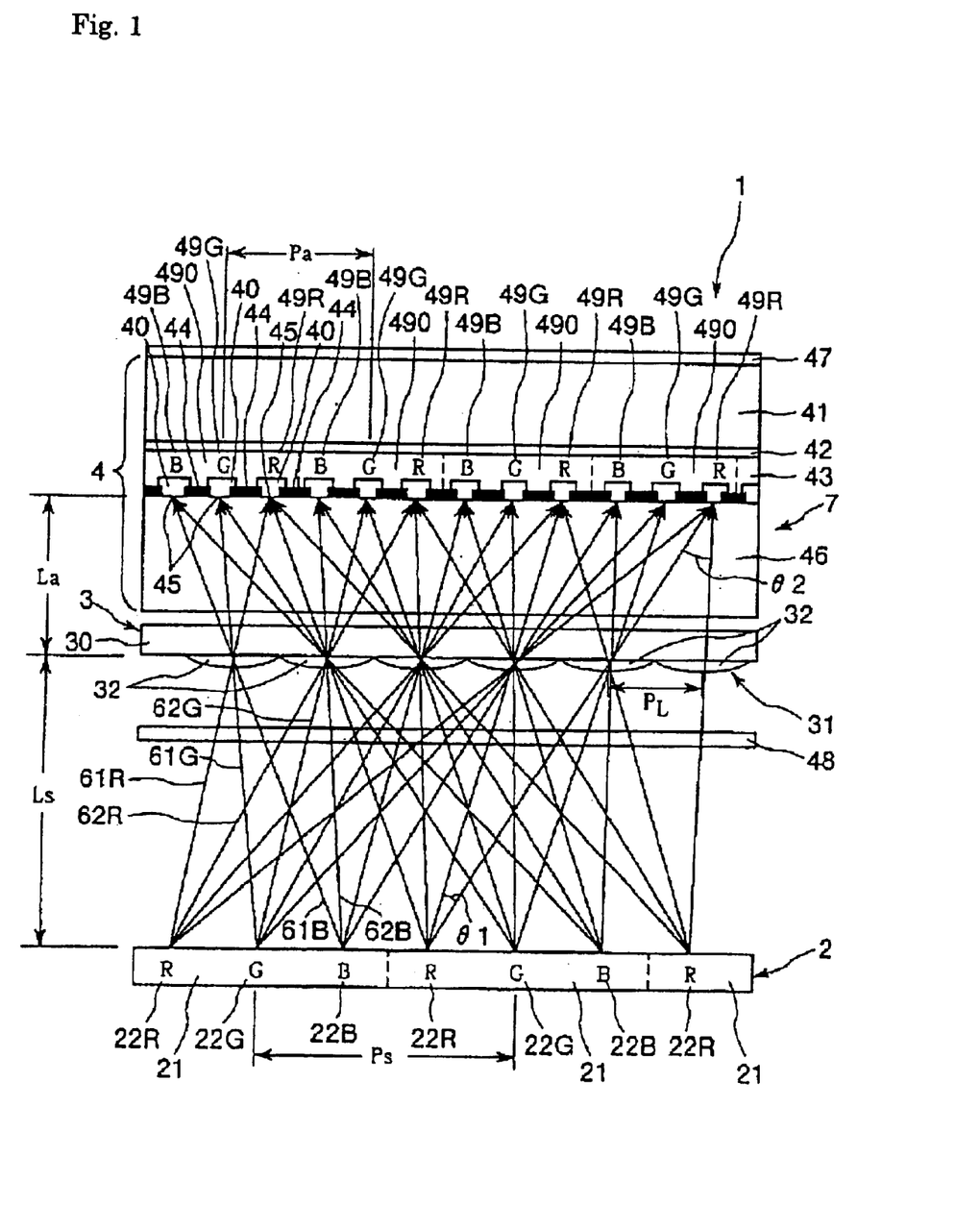
FIG. 1 is a longitudinal sectional view schematically showing the configuration of an electro-optical device according to a first embodiment of the present invention.

FIG. 1 is a longitudinal sectional view schematically showing the configuration of an electro-optical device according to a first specific embodiment of the present invention. Slanting lines showing the cross section are omitted in FIG. 1 in order to prevent the illustration from being complicated. Moreover, only the principal optical axes of light beams which pass through the centers of microlenses 32 are shown in FIG. 1 in order to prevent the illustration from being complicated.

An electro-optical device 1 shown in the figure is a space-division color (full-color) projection display device, and can include a dot-like light source array (light source) 2, a liquid crystal light valve 7, and a projection lens (projection optical system) which is not shown. The dot-like light source array 2 is disposed on the lower side in FIG. 1, the projection lens is disposed on the upper side in FIG. 1, and the liquid crystal light valve 7 is disposed between the light source 2 and the projection lens.

The liquid crystal light valve 7 includes a microlens array plate 3, a transmissive liquid crystal panel (optical modulation panel) 4 having a plurality of transmissive windows, and a pair of polarizers 47 and 48. The polarizer 47 is disposed on the upper side of the liquid crystal panel 4 in FIG. 1. The microlens array plate 3 is disposed on the lower side of the liquid crystal panel 4 in FIG. 1, and the polarizer 48 is disposed on the lower side of the microlens array plate 3 in FIG. 1.

The dot-like light source array 2 is a light source in which a plurality of light-emitting elements (dot-like light sources) 22R for emitting red light, a plurality of light-emitting elements (dot-like light sources) 22G for emitting green light, and a plurality of light-emitting elements (dot-like light sources) 22B for emitting blue light are arranged. In other words, the dot-like light source array 2 is formed of a dot-like light source unit array composed of a plurality of dot-like light source units 21, each unit having a light-emitting element 22R for emitting red light, a light-emitting element 22G for emitting green light, and a light-emitting element 22B for emitting blue light. In each dot-like light source unit 21, the light-emitting elements 22R, 22G, and 22B are arranged in that order from the left side to the right side in FIG. 1. The dot-like light source units 21 are arranged in a matrix, that is, in rows and columns (in the lateral direction of FIG. 1 and in the direction perpendicular to the plane of FIG. 1).

It should be understood that the light-emitting elements 22R, 22G, and 22B are not limited to a specific type. For example, a light-emitting diode (LED), a laser diode (an element for emitting laser light), an organic EL (Electroluminescence) element, or an inorganic EL element can be used. When light-emitting diodes are used as the light-emitting elements 22R, 22G, and 22B, light-emitting efficiency can be made relatively high, and the cost can be reduced. When laser diodes are used as the light-emitting elements 22R, 22G, and 22B, the polarizers 47 and 48 can be omitted. This can further enhance the utilization efficiency of light from the light-emitting elements. This also offers the advantages in the reduction of size and thickness because the number of components can be reduced. When organic EL elements or inorganic EL elements are used as the light-emitting elements 22R, 22G, and 22B, they can be easily patterned, and therefore, can be easily manufactured. This achieves high mass productivity.

The microlens array plate 3 can include a transparent substrate 30, and a microlens array 31 disposed under the substrate 30 in FIG. 1.

The microlens array 31 includes a plurality of microlenses (light-collecting lenses) 32 which have positive power. These microlenses 32 are arranged in rows and columns (in the lateral direction of FIG. 1 and in the direction perpendicular to the plane of FIG. 1).

It is preferable to use Fresnel microlenses (diffraction lenses) as the microlenses 32. That is, it is preferable to use a Fresnel microlens array as the microlens array 32. This can reduce the thickness of the microlens array 32 (microlenses 32), and can bring the advantage in the reduction of size and thickness.

It is more preferable that the material of the microlens array 31 (microlenses 32) has a higher refractive index. The refractive index of a general optical material is approximately 1.45 to 1.65.

The microlens array 31 and the substrate 30 are made of, for example, various resins such as acrylic resin and epoxy resin, or various glasses. The material of the microlens array 31 and the material of the substrate 30 may be the same or may be different. The microlens array 31 and the substrate 30 may be integrally molded, or may be separately molded.

It should be understood that a molding method for the microlens array plate 3, that is, a molding method for the microlens array 31 and the substrate 30 is not limited to a specific method. For example, injection molding, photopolymerization, dry etching, or wet etching may be used. Among these methods, however, injection molding or photopolymerization is more preferable.

By molding the microlens array plate 3 by injection molding or photopolymerization, the lens precision is improved, production is facilitated, mass productivity is enhanced, and the cost is reduced. In particular, injection molding achieves a lower cost than in polymerization. However, polymerization, in particular, polymerization for forming a pattern on a glass substrate (glass polymerization) is preferable because it achieves a wider range of working temperatures than when using injection molding.

The liquid crystal panel 4 is a transmissive liquid crystal panel including a plurality of red-light pixels 49R, a plurality of green-light pixels 49G, a plurality of blue-light pixels 49B, and a plurality of transmissive windows corresponding to the pixels 49R, 49G, and 49B. In other words, the liquid crystal panel 4 is formed of a liquid crystal unit array (optical modulation unit array) in which a plurality of liquid crystal units (optical modulation units) 490 are arranged. Each of the liquid crystal units 490 can include a red-light pixel 49R and a corresponding transmissive window, a green-light pixel 49G and a corresponding transmissive window, and a blue-light pixel 49B and a corresponding transmissive window. The pixels 49R, 49G, and 49B in each liquid crystal unit 490 are arranged in that order from the left side to the right side of FIG. 1. The liquid crystal units 490 are arranged in rows and columns (in the lateral direction of FIG. 1 and in the direction perpendicular to the plane of FIG. 1).

The structure of the liquid crystal panel 4 will be described in greater detail below.

The liquid crystal panel 4 can include a transparent substrate 41, a plurality of belt-shaped transparent electrodes 42 formed on the lower surface of the substrate 41 in FIG. 1 and extending in parallel in the direction perpendicular to the plane of FIG. 1, a transparent substrate 46 disposed at a predetermined distance from the lower side of the substrate 41 in FIG. 1, a plurality of belt-shaped transparent electrodes 40 and a black matrix 44 having a light-shielding function, both being formed on the upper surface of the substrate 46 in FIG. 1 and extending in parallel in the lateral direction of FIG. 1, and a liquid crystal layer 43 containing liquid crystal and interposed between the substrate 41 (transparent electrodes 42) and the substrate 46 (transparent electrodes 40).

The transparent electrodes 40 and the transparent electrodes 42 are substantially orthogonal to each other, and each of the intersections thereof (including portions adjacent to the intersections) corresponds to one pixel.

The liquid crystal in the liquid crystal layer 43 is driven by performing charging and discharging between the transparent electrodes 40 and the transparent electrodes 42.

The transparent electrodes 40 and 42 are made of, for example, indium tin oxide (ITO).

The black matrix 44 has a plurality of apertures 45 arranged in rows and columns. The black matrix 44 is placed so as to shield the portions between pixels, that is, the portions between the adjoining transparent electrodes 40 and the adjoining transparent electrodes 42. The apertures 45 are placed at the intersections of the transparent electrodes 42 and the transparent electrodes 40, and each of them corresponds to one pixel. The apertures 45 form transmissive windows of the liquid crystal panel 4 (portions which can transmit light).

The black matrix 44 has a light-shielding function, and is made of, for example, a metal such as Cr, Al, an Al alloy, Ni, Zn, or Ti, or a resin in which carbon, titanium, or the like is dispersed.

The substrates 41 and 46 are made of, for example, various glasses.

One of the substrates may be provided with switching elements, each corresponding to one pixel. The switching elements are connected to a control circuit (not shown), and control a current to be supplied to the transparent electrodes 40 or 42. Charging and discharging of the transparent electrodes 40 or 42 are thereby controlled.

The liquid crystal layer 43 contains liquid crystal molecules (not shown). The orientation of such liquid crystal molecules, that is, of the liquid crystal changes in response to the charging and discharging of the transparent electrodes 40 or 42. Accordingly, this makes it possible to arbitrarily switch between the transmission and cutoff of light and to adjust the illuminance in the pixels 49R, 49G, and 49B.

As the switching elements, for example, thin-film diodes (TFD) or thin-film transistors (TFT) may be used. When the thin-film transistors are used, transparent electrodes in a substrate where the transistors are formed are disposed in dots so that each of them corresponds to one pixel, and transparent electrodes in a counter substrate are disposed over the entire surface of the substrate.

In the electro-optical device 1, if the pitch of the dot-like light source units 21 is designated Ps, the pitch of the liquid crystal units 490 is designated Pa, the pitch of the microlenses 32 of the microlens array 31 is designated PL, the optical distance between the light-emitting elements 22R, 22G, and 22B and the microlens array 31 is designated Ls, and the optical distance between the microlens array 31 and the apertures (transmissive windows) 45 of the liquid crystal panel 4 is designated La, then the light-emitting elements 22R, 22G, and 22B, the microlenses 32 of the microlens array 31, and the pixels 49R, 49G, and 49B and the apertures 45 of the liquid crystal panel 4 are placed so as to satisfy the conditions given by the following Equations 1 and 2:

$$PL = \{Ps \cdot Pa/(Ps+Pa)\} \cdot n \quad (n \text{ is a natural number}) \quad (1)$$

$$La/Ls = Pa/Ps \quad (2)$$

Herein, the optical distance refers to the distance when it is assumed that the environment is under a vacuum, that is, the value obtained by dividing the actual distance by the refractive index of a substance which constitutes the optical path.

The conditions given by the above Equations 1 and 2 are satisfied in the lateral direction of FIG. 1 and in the direction perpendicular to the plane of FIG. 1.

The electro-optical device is configured so that the condition given by the following Equation 3 is to be satisfied when the focal length of the microlenses 32 is designated f. Equation 3 is a conditional expression given so that images which conform to the shape of the light-emitting portions of the light-emitting elements 22R, 22G, and 22B are formed at the apertures 45 of the liquid crystal panel 4 by the microlenses 32.

$$1/Ls + 1/La = 1/f \quad (3)$$

The pitch Ps of the dot-like light source units 21, the pitch Pa of the liquid crystal units 490, the pitch PL of the microlenses 32 of the microlens array 31, the optical distance Ls between the light-emitting elements 22R, 22G, and 22B and the microlens array 31, the optical distance La between the microlens array 31 and the apertures (transmissive windows) 45 of the liquid crystal panel 4, and the focal length f of the microlenses 32 are appropriately set so as to satisfy the conditions given by the above Equations 1, 2, and 3, for example, depending on applications.

For example, in a projector, it is preferable to set the above values as follows. Preferably, the pitch Ps of the dot-like light source units 21 is approximately 0.01 mm to 10 mm.

Preferably, the pitch Pa of the liquid crystal units 490 is approximately 0.01 mm to 0.1 mm.

Preferably, the pitch PL of the microlenses 32 is approximately 0.005 mm to 0.1 mm.

Preferably, the optical distance Ls between the light-emitting elements 22R, 22G, and 22B and the microlens array 31 is approximately 0.3 mm to 100 mm.

Preferably, the optical distance La between the microlens array 31 and the apertures 45 of the liquid crystal panel 4 is approximately 0.1 mm to 5 mm.

Preferably, the focal length f of the microlenses 32 is approximately 0.07 mm to 5 mm.

It should be understood that the shape in plan (planar shape), dimensions, and the like of the microlenses 32 are not specifically limited, and may be appropriately set in accordance with the shape of the pixels in the liquid crystal panel 4. Preferably, the shape in plan of the microlenses 32 is similar to that of the pixels in the liquid crystal panel 4, and is, for example, quadrilateral such as rectangular and square, or circular.

Preferably, the optical distance Ls is set to be greater than the optical distance La. That is, it is preferable that the pitch Ps of the dot-like light source units 21 be greater than the pitch Pa of the liquid crystal units 490. Accordingly, this makes it possible to make the pitch Ps of the dot-like light source units 21 relatively long, and to make the number of the dot-like light source units 21 (the number of the light-emitting elements 22R, 22G, and 22B) relatively small. As a result, production is facilitated.

The optical distances Ls and La can be adjusted by, for example, setting the thickness of the substrate 46 or the like to a desired value.

FIG. 1 shows a case in which the optical distance Ls is set to be greater than the optical distance La (the pitch Ps of the dot-like light source units 21 is set to be greater than the pitch Pa of the liquid crystal units 490), and n equals 1.

The microlenses 32 have the optical property of focusing all the light components (all the light beams having the optical axes) emitted from the light-emitting elements 22R, 22G, and 22B of the dot-like light source array 2 to predetermined apertures 45 of the liquid crystal panel 4.

As shown in FIG. 1, almost all the light beams emitted from the light-emitting elements 22R, 22G, and 22B of the dot-like light source array 2 are collected at any apertures 45 by the action of any microlenses 32.

For example, a red light beam 61R, which enters the first microlens 32 from the left in FIG. 1, of red light beams (R) emitted from the light-emitting element 22R of the first dot-like light source unit 21 from the left in FIG. 1, is collected by the microlens 32 at the aperture 45 corresponding to the pixel 49R of the first liquid crystal unit 490 from the left in FIG. 1. A red light beam 62R which enters the second microlens 32 from the left in FIG. 1 is collected at the aperture 45 corresponding to the pixel 49R of the second liquid crystal unit 490 from the left in FIG. 1 by the microlens 32. Similarly, every red light beam is collected at a corresponding aperture 45 by a corresponding microlens 32.

Similarly, a green light beam 61G, which enters the first microlens 32 from the left in FIG. 1, of green light beams (R) emitted from the light-emitting element 22G of the first dot-like light source unit 21 from the left in FIG. 1, is collected by the microlens 32 at the aperture 45 corresponding to the pixel 49G of the first liquid crystal unit 490 from the left in FIG. 1. A green light beam 62G which enters the second microlens 32 from the left side in FIG. 1 is collected at the aperture 45 corresponding to the pixel 49G of the second liquid crystal unit 490 from the left in FIG. 1 by the microlens 32. Similarly, every green light beam is collected at a corresponding aperture 45 by a corresponding microlens 32.

Similarly, a blue light beam 61G, which enters the first microlens 32 from the left in FIG. 1, of blue light beams (B) emitted from the light-emitting element 22B of the first dot-like light source unit 21 from the left in FIG. 1, is collected at then aperture 45 corresponding to the pixel 49B of the first liquid crystal unit 490 from the left in FIG. 1 by the microlens 32. A blue light beam 62B which enters the second microlens 32 from the left in FIG. 1 is collected at the aperture 45 corresponding to the pixel 49B of the second liquid crystal unit 490 from the left in FIG. 1 by the microlens 32. Similarly, every red light beam is collected at a corresponding aperture 45 by a corresponding microlens 32.

Similarly, red light beams emitted from the light-emitting elements 22R of the dot-like light source units 21 subsequent to the second dot-like light source unit 21 from the left in FIG. 1, similar green light beams emitted from the light-emitting elements 22G, and similar blue light beams emitted from the light-emitting elements 22B are collected at the corresponding apertures by the corresponding microlenses 32.

Regarding an aperture 45 corresponding to a predetermined pixel 49R, red light beams emitted from a plurality of light-emitting elements 22R are collected at the aperture 45 by the microlens array 31. Regarding an aperture 45 corresponding to a predetermined pixel 49G, green light beams emitted from a plurality of light-emitting elements 22G are collected at the aperture 45 by the microlens array 31. Regarding an aperture 45 corresponding to a predetermined pixel 49B, blue light beams emitted from a plurality of light-emitting elements 22B are collected at the aperture 45 by the microlens array 31.

Regarding a predetermined microlens 32, the microlens 32 collects red light beams emitted from a plurality of light-emitting elements 22R at apertures 45 corresponding to a plurality of pixels 49R, collects green light beams emitted from a plurality of light-emitting elements 22G at apertures 45 corresponding to a plurality of pixels 49G, and collects blue light beams emitted from a plurality of light-emitting elements 22B at apertures 45 corresponding to a plurality of pixels 49B.

In this way, in the electro-optical device 1, light emitted from the dot-like light source array 2 can be efficiently collected at the apertures 45. This can enhance the utilization efficiency of the light emitted from the dot-like light source array 2.

Since light beams emitted from a plurality of (multiple) dot-like light source units 21 (light-emitting elements 22R, 22G, and 22B) are collected at one aperture 45, the brightness is averaged. In other words, even when there are variations in the amount of light from the dot-like light source units 21 (light-emitting elements 22R, 22G, and 22B), the positions of the dot-like light source units 21 (light-emitting elements 22R, 22G and 22B), and the like, light collected at the aperture 45 is the average of the light beams emitted from the dot-like light source units 21. Therefore, there is little difference in amount of light in the pixels 49R, 49G, and 49B and a uniform display can be achieved.

Additionally, when producing (assembling) the electro-optical device 1, only one position adjusting step is necessary. In particular, since the emergent angles θ1 and θ2 toward the adjoining points are relatively small, the above averaging is highly effective, and the positional relationship between the dot-like light source array 2 (dot-like light source units 21) and the microlens array 31 need not be strictly adjusted. That is, during position adjustment, the apertures 45 are positioned at the focal positions determined by the dot-like light source array 2 (dot-like light source units 21) and the microlens array 31 which have an appropriate positional relationship. It is only necessary to perform such an adjustment step once.

Accordingly, the position adjustment can be easily, quickly, and reliably performed, and high productivity is ensured. This is advantageous in mass production.

When n equals 1, the pitch PL of the microlenses 32 can be set to be less than that when n is greater than 1. Therefore, the focal length f of the microlenses 32 can be increased, that is, the number of apertures NA of the microlenses 32 can be decreased. This makes it possible to easily produce the microlens array 31, to improve the precision, and to reduce aberrations.

Next, the operation of the electro-optical device 1 will be described.

As shown in FIG. 1, red, green, and blue light beams emitted from the light-emitting elements 22R, 22G, and 22B of the dot-like light source array 2 in the electro-optical device 1 are polarized by the polarizer 48, enter the microlenses 32 of the microlens array 31, and emerge from the microlenses 32 so that they are collected at the corresponding apertures 45 by the action of the microlenses 32, as described above.

The light beams emerging from the microlenses 32 pass through the substrate 30 and the substrate 46, are collected at the corresponding apertures 45, and are transmitted through (pass through) the apertures 45.

The light beams transmitted through the apertures 45 are subjected to intensity modulation by the liquid crystal in the liquid crystal layer 43 whose orientation is controlled by the voltages applied between the transparent electrodes 42 and the transparent electrodes 40, thereby forming a color (full-color) image. The light beams are transmitted through the substrate 41, are polarized by the polarizer 47, and emerge to the outside.

The light from the liquid crystal panel 4, that is, the image formed by the liquid crystal panel 4 is projected (enlarged and projected) onto a screen (not shown) placed at a predetermined position by a projection lens (not shown).

In this way, a full-color image (projection image) is displayed on the screen.

As described above, the electro-optical device 1 can efficiently collect the light emitted from the dot-like light source array 2 at the apertures 45. This can enhance the utilization efficiency of the light emitted from the dot-like light source array 2.

Since the light-emitting elements 22R for emitting red light, the light-emitting elements 22G for emitting green light, and the light-emitting elements 22B for emitting blue light are used as the light source, the color purity can be made higher than in a case in which a white light source is used and in which white light is separated into red light, green light, and blue light. Further, since there is no need to use a color-separating means, such as a dichroic mirror or a color filter, it is possible to reduce the number of components, to reduce the size of the device, and to reduce the cost.

In the electro-optical device 1, the total amount of red light, the total amount of green light, and the total amount of blue light can be freely set (adjusted) in the dot-like light source units 21. In order to adjust the total amount of red light, the total amount of green light, and the total amount of blue light, for example, the number, layout, and the like of the light-emitting elements 22R, 22G, and 22B in the dot-like light source units 21 may be changed.

In the present invention, the number and layout of the light-emitting elements 22R, 22G, and 22B in the dot-like light source units 21, the number and layout of the pixels 49R, 49G, and 49B in the liquid crystal units 490, and the like are not specifically limited. For example, each dot-like light source unit 21 may include a plurality of light-emitting elements 22R, a plurality of light-emitting elements 22G, and a plurality of light-emitting elements 22B.

Each liquid crystal unit 490 may include a plurality of pixels 49R, a plurality of pixel 49G, and a plurality of pixels 49B.

Figure 2:
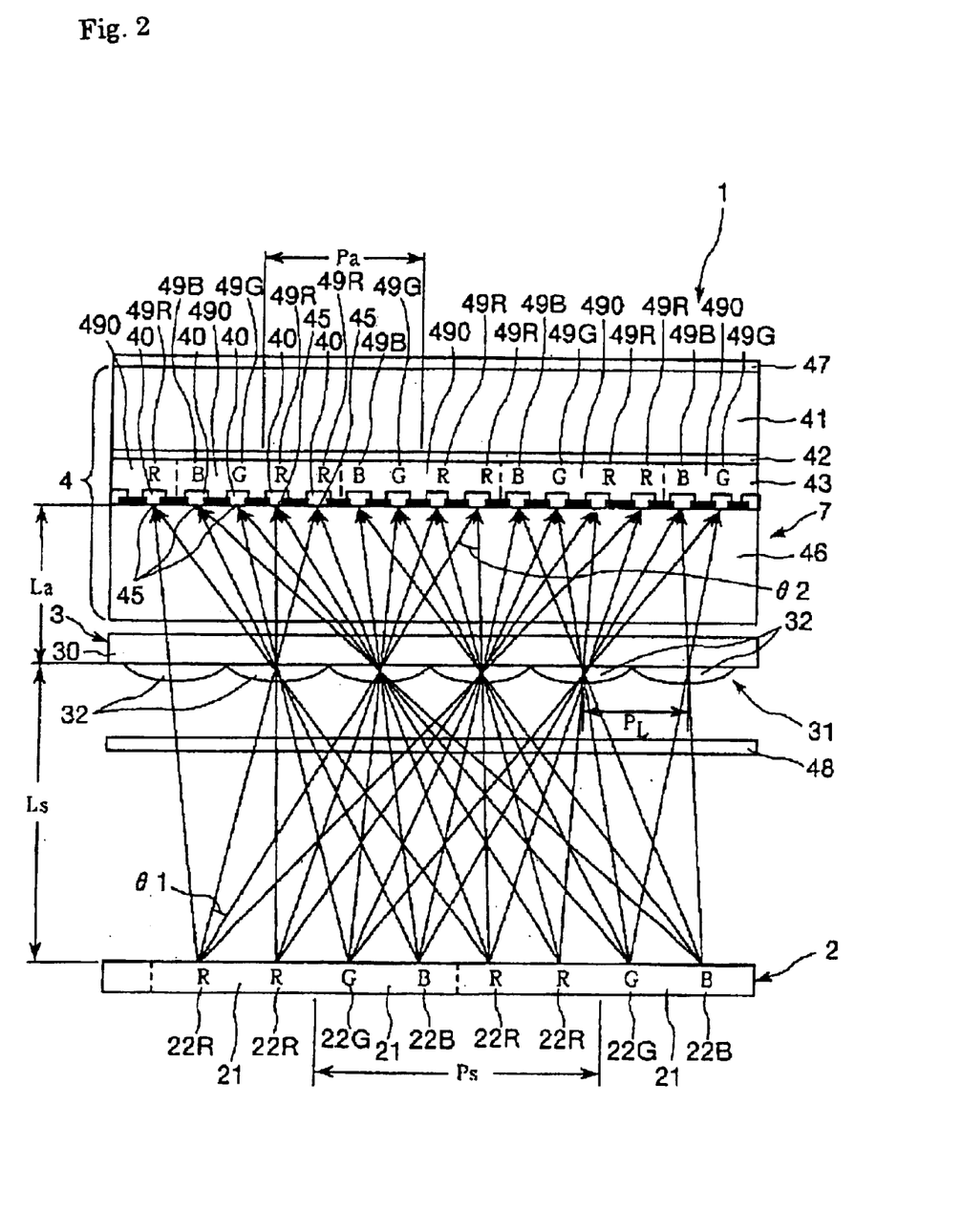
FIG. 2 is a longitudinal sectional view schematically showing the configuration of an electro-optical device according to a second embodiment of the present invention.

Next, an electro-optical device according to a second specific embodiment of the present invention will be described.

FIG. 2 is a longitudinal sectional view schematically showing the configuration of the electro-optical device according to the second specific embodiment of the present invention. Slanting lines showing the cross section are omitted in FIG. 2 in order to prevent the illustration from being complicated. Moreover, only the principal optical axes of light beams which pass through the centers of microlenses 32 are shown in FIG. 2 in order to prevent the illustration from being complicated.

The following description will be given with particular emphasis on differences of an electro-optical device 1 of the second embodiment from the above-described first embodiment, and descriptions of similar matters are omitted.

As shown in FIG. 2, in the electro-optical device 1, two light-emitting elements 22R for emitting red light are disposed in each dot-like light source unit 21, and two pixels 49R for red light are disposed in each liquid crystal unit 490 corresponding thereto. Other structures are similar to those in the above-described first embodiment.

Figure 3:
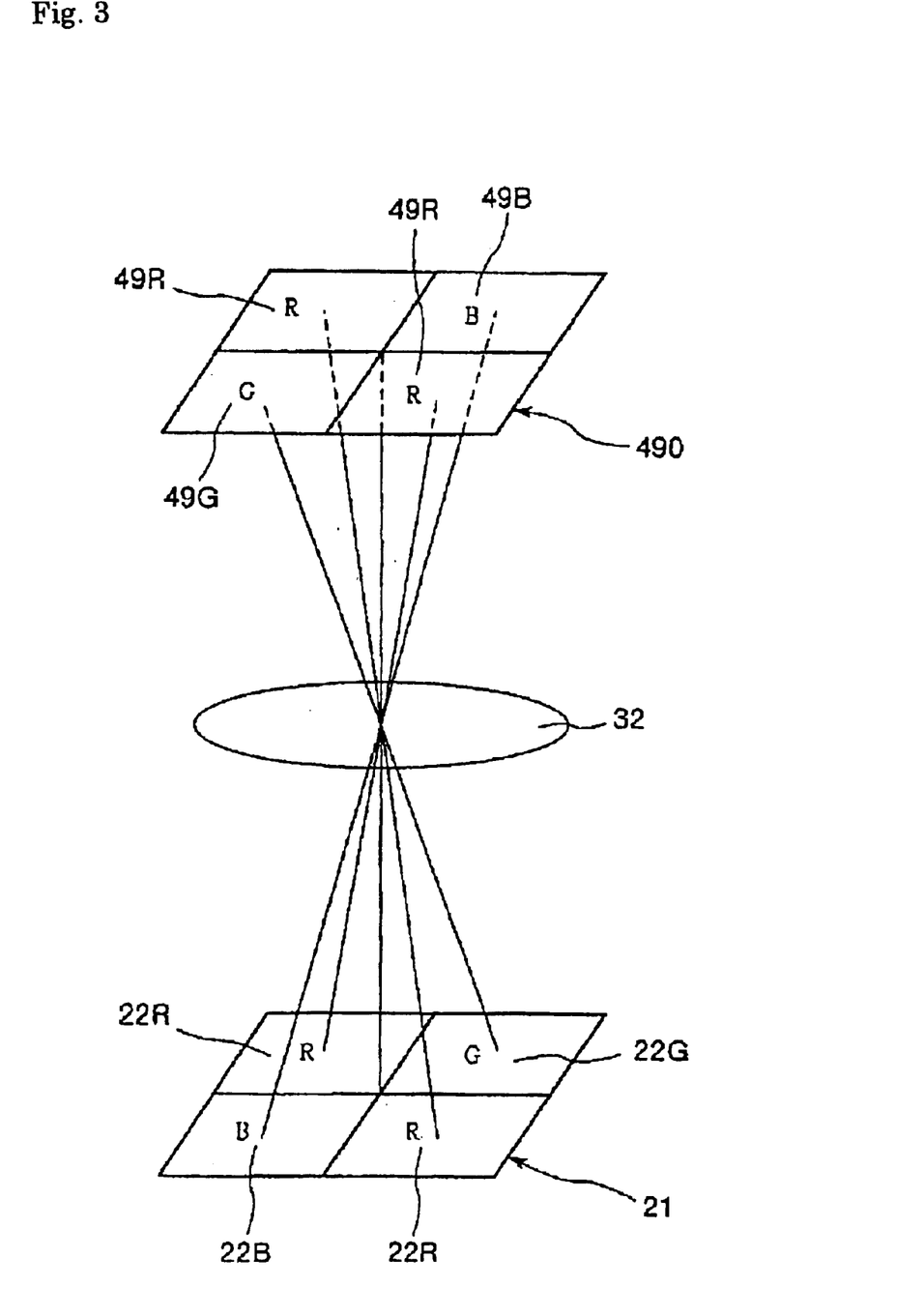
FIG. 3 is a perspective view schematically showing modifications of structures of a dot-like light source unit and a liquid crystal unit in the electro-optical device shown in FIG. 2.

FIG. 3 is a perspective view schematically showing modifications of structures of the dot-like light source unit 21 and the liquid crystal unit 490 in the electro-optical device 1 shown in FIG. 2. In FIG. 3, only the principal optical axes of light beams passing through the center of the microlens 32 is shown in order to prevent the illustration from being complicated.

As shown in the figure, the dot-like light source unit 21 has a structure in which two light-emitting elements 22R, one light-emitting element 22G, and one light-emitting element 22B are placed in a two by two array.

That is, the light-emitting element 22B is placed on the lower left side of FIG. 3, the light-emitting element 22G is placed on the upper right side of FIG. 3, and the light-emitting elements 22R are placed on the lower right side and on the upper left side of FIG. 3.

Corresponding to the dot-like light source unit 21, the liquid crystal unit 490 has a structure in which two pixels 49R, one pixel 49G, and one pixel 49B are placed in a two by two array. In other words, the pixel 49B is placed on the upper right side of FIG. 3, the pixel 49G is placed on the lower left side of FIG. 3, and the pixels 49R are placed on the upper left side and on the lower right side of FIG. 3.

Blue light emitted from the light-emitting element 22B is collected at an aperture 45 corresponding to the pixel 49B by the microlens 32, green light emitted from the light-emitting element 22G is collected at an aperture 45 corresponding to the pixel 49G by the microlens 32, red light emitted from the light-emitting element 22R on the lower right side of FIG. 3 is collected at an aperture 45 corresponding to the pixel 49R on the upper left side of FIG. 3 by the microlens 32, and red light emitted from the light-emitting element 22R on the upper left side of FIG. 3 is collected at an aperture 45 corresponding to the pixel 49R on the lower right side of FIG. 3.

The electro-optical device 1 of the second embodiment provides advantages similar to those of the above-described first embodiment.

In the electro-optical device 1, a display which achieves a strong red color can be produced. Even when the red color is weak, it is compensated for by using two light-emitting elements 22R, so that a more natural color can be displayed.

It should be understood that the electro-optical device of the present invention is not limited to the projection display device, and may be, for example, a direct-view display device. A case in which the present invention is applied to a direct-view display device will be described below.

When the present invention is applied to the direct-view display device, it is preferable that a light-scattering layer (light-scattering plate) be disposed on the emergent side of a liquid crystal panel (optical modulation panel) 4. Accordingly, this can prevent a white display from being rainbow-hued, and allows the display to have a clearer image.

It is preferable to set the optical distance Ls and the optical distance La to be equal, that is, to set the pitch Ps of the dot-like light source units 21 and the pitch Pa of the liquid crystal units 490 to be equal, or to set the optical distance Ls to be greater than the optical distance La, that is, to set the pitch Ps of the dot-like light source units 21 to be greater than the pitch Pa of the liquid crystal units 490. By setting the optical distance Ls and the optical distance La to be equal, the focal length f of the microlenses 32 can be maximized (the numerical aperture NA can be minimized). This makes it possible to easily produce the microlens array 31, to improve the precision, and to reduce aberrations.

By setting the optical distance Ls to be greater than the optical distance La, the pitch Ps of the dot-like light source units 21 can be made relatively long, and the number of the dot-like light source units 21 (the number of the light-emitting elements 22R, 22G, and 22B) can be made relatively small. Therefore, production is facilitated.

When the present invention is applied to the direct-view display device, for example, a transmissive display device using a transmissive liquid crystal panel as the optical modulation panel, or a semi-transmissive and semi-reflective display device using a semi-transmissive and semi-reflective liquid crystal panel as the optical modulation panel are achieved.

While the electro-optical device of the present invention has been described above in connection with the illustrated specific embodiments, it should be understood that the present invention is not limited to the embodiments. The structures of the components may be replaced with arbitrary structures having similar functions without departing from the spirit and scope of the present invention.

For example, in the present invention, arbitrary two or more of the structures in the embodiments and the case in which the present invention is applied to the direct-view display device may be appropriately combined.

The present invention is applicable to, for example, direct-view display devices for various electronic devices, such as monitors (displays) of personal computers such as laptop personal computers and notebook-size personal computers, television monitors, picturephone monitors, and monitors of portable electronic devices such as portable telephones (including a PHS), electronic notebooks, electronic dictionaries, electronic cameras (digital cameras), and video cameras, and to projection display devices such as projectors.

Electronic devices of the present invention having the display devices (electro-optical devices) of the above-described embodiments will be described in greater detail below in connection with embodiments shown in FIGS. 4 to 6.

Figure 4:
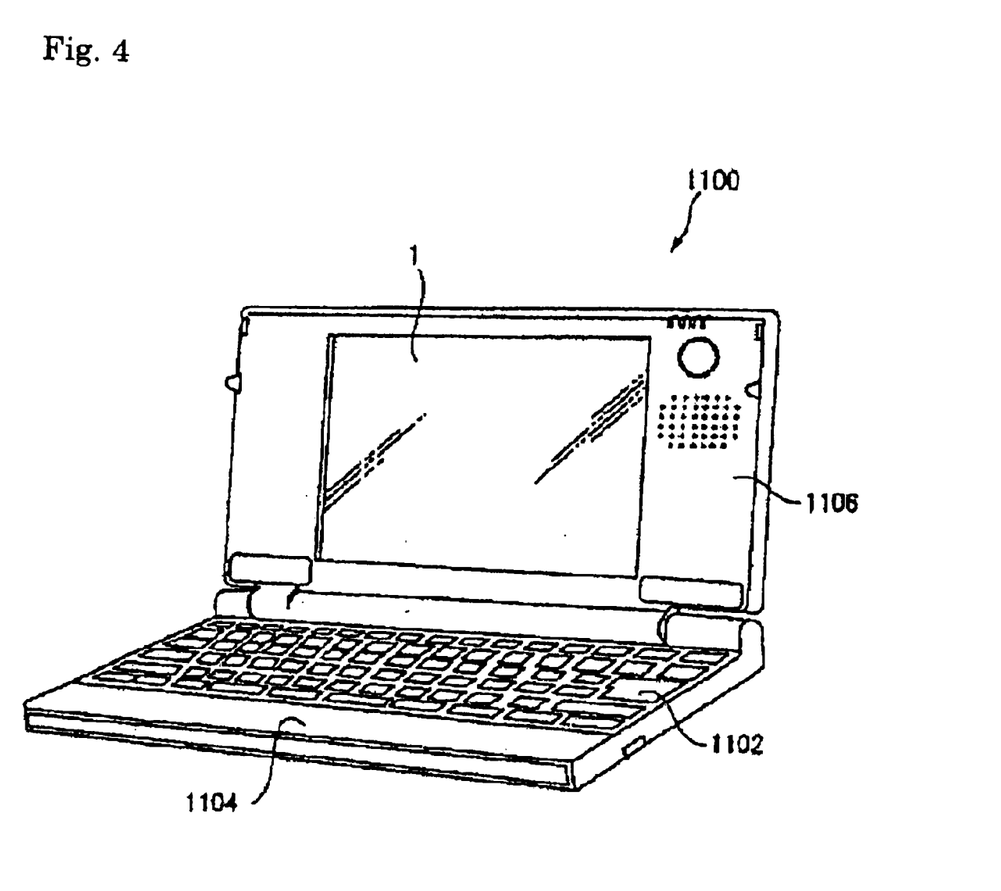
FIG. 4 is a perspective view showing an example of a configuration of a mobile personal computer to which the electro-optical device of the embodiment of the present invention is applied.

FIG. 4 is a perspective view showing the configuration of a mobile (or notebook-size) personal computer to which the above-described display device is applied. In this figure, a personal computer 100 includes a body unit 1104 having a keyboard 1102, and a display unit 1106. The display unit 1106 is pivotally supported relative to the body unit 1104 via a hinge structure.

In the personal computer 1100, the display unit 1106 has the above-described display device (electro-optical device) 1.

Figure 5:
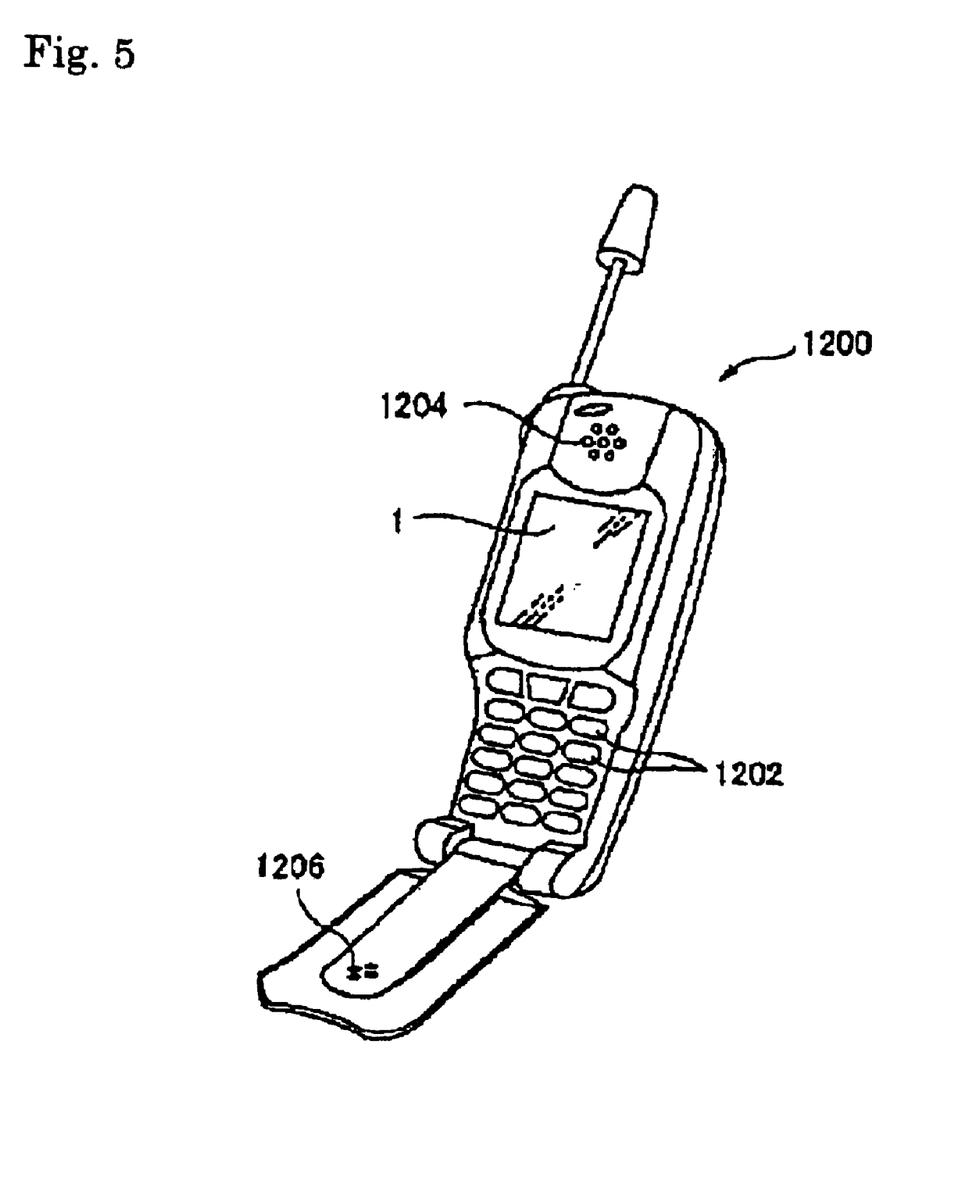
FIG. 5 is a perspective view showing an example of a configuration of a portable telephone having a display to which the electro-optical device of the embodiment of the present invention is applied.

FIG. 5 is a perspective view showing the configuration of a portable telephone (including a PHS) having a display section to which the above-described display device is applied. In this figure, a portable telephone 1200 includes a plurality of control buttons 1202, an earpiece 1204, a mouthpiece 1206, and the above-described display device (electro-optical device) 1.

Figure 6:
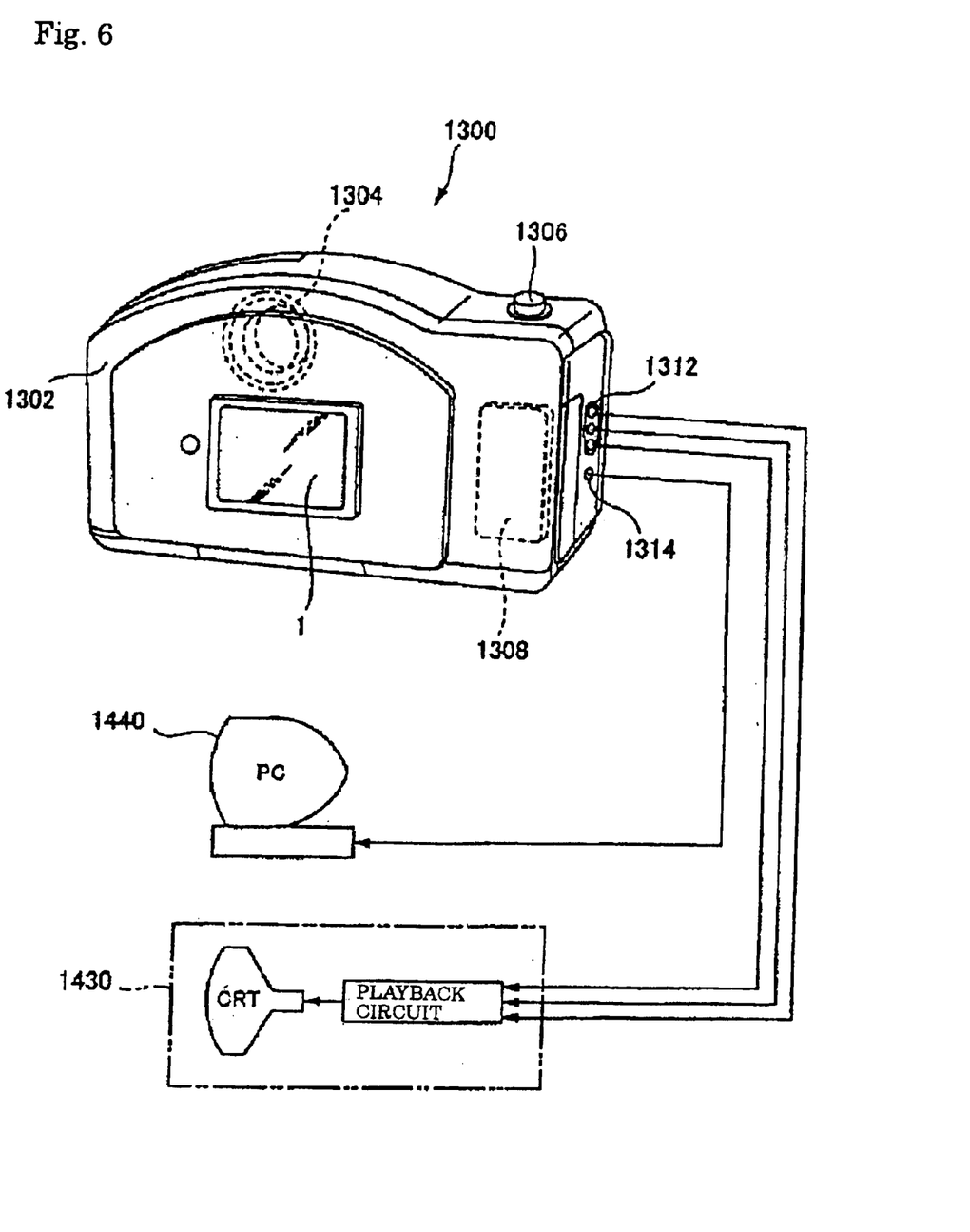
FIG. 6 is a perspective view showing an example of a configuration of a digital still camera having a finder to which the electro-optical device of the embodiment of the present invention is applied.

FIG. 6 is a perspective view showing the configuration of a digital still camera having a finder to which the above-described display device is applied. In this figure, the connection to external devices is simply shown.

In a normal camera, a silver photographic film is exposed by an optical image of a subject. In contrast, in a digital still camera 1300, an optical image of a subject is photoelectrically converted by an image pickup device, such as a CCD (Charge Coupled Device), thereby generating image signals.

The above-described display device (electro-optical device) 1 is disposed at the back of a case (body) 1302 of the digital still camera 1300, and produces display on the basis of image signals from the CCD. The display device 1 functions as a finder which displays a subject as an electronic image.

A circuit board 1308 is placed inside the case 1302. The circuit board 1308 has a memory which can store image signals.

A light-receiving unit 1304 including optical lenses (image pickup optical system), the CCD, and the like is disposed on the front side of the case 1302 (on the back side in FIG. 6).

When a person capturing an image observes a subject image displayed on the display device 1 and depresses a shutter button 1306, image signals in the CCD at that time are transferred to and stored in the memory of the circuit board 1308.

In the digital still camera 1300, a video-signal output terminal 1312 and a data-communication input-output terminal 1314 are disposed on the side face of the case 1302. As shown in FIG. 6, a television monitor 1430 is connected to the video-signal output terminal 1312, and a personal computer 1440 can be connected to the data-communication input-output terminal 1314, if necessary. Image signals stored in the memory of the circuit board 1308 are output to the television monitor 1430 and the personal computer 1440 by a predetermined operation.

Besides the personal computer shown in FIG. 4, the portable telephone shown in FIG. 5, and the digital still camera shown in FIG. 6, electronic devices to which the electro-optical device of the present invention can be applied can include, for example, televisions, view-finder and direct-view video tape recorders, car navigation systems, pagers, electronic notebooks (including a type having the communication function), desktop calculators, electronic game systems, word processors, work stations, picturephones, security television monitors, electronic binoculars, point of sale (POS) terminals, devices having a touch panel (for example, cash dispensers in financial institutions), medical instruments (for example, electronic thermometers, sphygmomanometers, blood-glucose monitors, electrocardiograph displays, ultrasonic diagnostic devices, and endoscope displays), fish detectors, various measuring devices, meters (for example, meters of vehicles, aircraft, and ships), flight simulators, other various monitors, and projection display devices such as projectors. Of course, the above-described display device (electro-optical device) is also applicable to display sections or monitor sections of these various electronic devices.

As described above, the present invention makes it possible to produce a full-color display with high color purity.

It is also possible to efficiently collect light emitted from the light source at the transmissive windows, and to thereby enhance the utilization efficiency of the light emitted from the light source.

Moreover, since there is no need to use a color-separating device, such as a dichroic mirror or a color filter, the size of the device can be reduced.

What is claimed is:

1. An electro-optical device, comprising:
    a dot-like light source array in which a plurality of light-emitting elements that emit red light, a plurality of light-emitting elements that emit green light, and a plurality of light-emitting elements that emit blue light are arranged;
    a microlens array in which a plurality of microlenses are arranged; and
    an optical modulation panel having a plurality of pixels for red light, a plurality of pixels for green light, a plurality of pixels for blue light, and a plurality of transmissive windows corresponding to the pixels;
    the electro-optical device being configured so that
        the microlens array collects light from the light-emitting elements that emit red light at the transmissive windows corresponding to the pixels for red light, light from the light-emitting elements that emits green light at the transmissive windows corresponding to the pixels for green light, and light from the light-emitting elements that emits blue light at the transmissive windows corresponding to the pixels for blue light,-and
        the light from one light-emitting element crosses paths with the light from another light-emitting element between the light-emitting elements and the transmissive windows so as to be focused at two or more transmissive windows,
    the dot-like light source array including a plurality of dot-like light source units, each of the dot-like light source units having at least one light-emitting element that emits red light, at least one light-emitting element that emits green light, and at least one light-emitting element that emits blue light,
    the optical modulation panel including an optical modulation unit array in which a plurality of optical modulation units are arranged, each of the optical modulation units having at least one pixel for red light and a corresponding transmissive window, at least one pixel for green light and a corresponding transmissive window, and at least one pixel for blue light and a corresponding transmissive window, and
    the electro-optical device being configured so that conditions given by the following equations are satisfied:

$$PL = \{P_s \cdot P_a / (P_s + P_a)\} \cdot n \quad (n \text{ is a natural number})$$

$$L_a / L_s = P_a / P_s$$

where $P_s$ represents a pitch of the dot-like light source units, $P_a$ represents a pitch of the optical modulation units, $PL$ represents a pitch of the microlenses of the microlens array, $L_s$ represents an optical distance between the light-emitting elements and the microlens array, and $L_a$ represents an optical distance between the microlens array and the transmissive windows of the optical modulation panel.

2. The electro-optical device according to claim 1, the light-emitting elements, the microlenses of the microlens array, and the pixels and the transmissive windows of the optical modulation panel being positioned so that the microlenses of the microlens array collects light emitted from the light-emitting elements at the transmissive windows.

3. The electro-optical device according to claim 1, the pitch $P_s$ of the dot-like light source units being greater than the pitch $P_a$ of the optical modulation units.

4. The electro-optical device according to claim 1, the electro-optical device being a direct-view display device, and having a light-scattering layer disposed on an emergent side of the optical modulation panel.

5. The electro-optical device according to claim 1, the electro-optical device being at least one of a direct-view display device and a projection display device.

6. An electronic device having the electro-optical device according to claim 1.

7. An electro-optical device, comprising:
    a dot-like light source array in which a plurality of light-emitting elements that emit red light, a plurality of light-emitting elements that emit green light, and a plurality of light-emitting elements that emits blue light are arranged;

a microlens array in which a plurality of microlenses are arranged; and an optical modulation panel having a plurality of pixels for red light, a plurality of pixels for green light, a plurality of pixels for blue light, and a plurality of transmissive windows corresponding to the pixels;

the light-emitting elements, the microlenses of the microlens array, and the pixels and the transmissive windows of the optical modulation panel being arranged so that the microlens array collects light from the light-emitting elements that emit red light at the transmissive windows corresponding to the pixels for red light, light from the light-emitting elements that emits green light at the transmissive windows corresponding to the pixels for green light, and light from the light-emitting elements that emits blue light at the transmissive windows corresponding to the pixels for blue light, and the light from one light-emitting element crosses paths with the light from another light-emitting element between the light-emitting elements and the transmissive windows so as to be focused at two or more transmissive windows, the dot-like light source array including a plurality of dot-like light source units, each of the dot-like light source units having at least one light-emitting element that emits red light, at least one light-emitting element that emits green light, and at least one light-emitting element that emits blue light, the optical modulation panel including an optical modulation unit array in which a plurality of optical modulation units are arranged, each of the optical modulation units having at least one pixel for red light and a corresponding transmissive window, at least one pixel for green light and a corresponding transmissive window, and at least one pixel for blue light and a corresponding transmissive window, and the electro-optical device being configured so that conditions given by the following equations are satisfied:

$$PL=\{Ps \cdot Pa/(Ps+Pa)\} \cdot n \text{ (} n \text{ is a natural number)}$$

$$La/Ls=Pa/Ps$$

where Ps represents a pitch of the dot-like light source units, Pa represents a pitch of the optical modulation units, PL represents a pitch of the microlenses of the microlens array, Ls represents an optical distance between the light-emitting elements and the microlens array, and La represents an optical distance between the microlens array and the transmissive windows of the optical modulation panel.

8. The electro-optical device according to claim 7, the light-emitting elements, the microlenses of the microlens array, and the pixels and the transmissive windows of the optical modulation panel being arranged so that the microlenses of the microlens array collect light from the light-emitting elements at the transmissive windows.

9. The electro-optical device according to the claim 7, the pitch Ps of the dot-like light source units being greater than the pitch Pa of the optical modulation units.

10. The electro-optical device according to claim 7, the electro-optical device being a direct-view display device, and having a light-scattering layer disposed on the emergent side of the optical modulation panel.

11. The electro-optical device according to claim 7, the electro-optical device being at least one of a direct-view display device and a projection display device.

12. An electronic device having the electro-optical device according to claim 7.

13. An electro-optical device, comprising:

a dot-like light source array in which a plurality of light-emitting elements that emit red light, a plurality of light-emitting elements that emit green light, and a plurality of light-emitting elements that emit blue light are arranged;

a microlens array in which a plurality of microlenses are arranged; and an optical modulation panel having a plurality of pixels for red light, a plurality of pixels for green light, a plurality of pixels for blue light, and a plurality of transmissive windows corresponding to the pixels, the light-emitting elements, the microlenses of the microlens array, and the pixels and the transmissive windows of the optical modulation panel being arranged so that the microlenses of the microlens array collect light from the light-emitting elements that emit red light at the transmissive windows corresponding to the pixels for red light, collect light from the light-emitting elements that emit green light at the transmissive windows corresponding to the pixels for green light, and collect light from the light-emitting elements that emit blue light at the transmissive windows corresponding to the pixels for blue light, and the light from one light-emitting element crosses paths with the light from another light-emitting element between the light-emitting elements and the transmissive windows so as to be focused at two or more transmissive windows, the dot-like light source array including a plurality of dot-like light source units, each of the dot-like light source units having at least one light-emitting element that emits red light, at least one light-emitting element that emits green light, and at least one light-emitting element that emits blue light, the optical modulation panel including an optical modulation unit array in which a plurality of optical modulation units are arranged, each of the optical modulation units having at least one pixel for red light and a corresponding transmissive window, at least one pixel for green light and a corresponding transmissive window, and at least one pixel for blue light and a corresponding transmissive window, and the electro-optical device being configured so that conditions given by the following equations are satisfied:

$$PL=\{Ps \cdot Pa/(Ps+Pa)\} \cdot n \text{ (} n \text{ is a natural number) } La/Ls=Pa/Ps$$

where Ps represents a Ditch of the dot-like light source units, Pa represents a pitch of the optical modulation units, PL represents a pitch of the microlenses of the microlens array, Ls represents an optical distance between the light-emitting elements and the microlens array, and La represents an optical distance between the microlens array and the transmissive windows of the optical modulation panel.

14. The electro-optical device according to claim 13, the pitch Ps of the dot-like light source units being greater than the pitch Pa of the optical modulation units.

15. The electro-optical device according to claim 13, the electro-optical device being a direct-view display device, and having a light-scattering layer disposed on an emergent side of the optical modulation panel.

16. The electro-optical device according to claim 13, the electro-optical device being at least one of a direct-view display device and a projection display device.

17. An electronic device having the electro-optical device according to claim 13.

* * * * *